(12) United States Patent
Robison

(10) Patent No.: US 9,203,252 B2
(45) Date of Patent: Dec. 1, 2015

(54) REDIRECTING NOTIFICATIONS TO A WEARABLE COMPUTING DEVICE

(71) Applicant: Google Inc., Mountain View, CA (US)

(72) Inventor: Austin Robison, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/134,771

(22) Filed: Dec. 19, 2013

(65) Prior Publication Data

US 2015/0130623 A1 May 14, 2015

Related U.S. Application Data

(60) Provisional application No. 61/903,231, filed on Nov. 12, 2013.

(51) Int. Cl.
| G08B 21/00 | (2006.01) |
| G08B 23/00 | (2006.01) |
| G06F 3/041 | (2006.01) |
| G08B 21/18 | (2006.01) |
| H02J 7/00  | (2006.01) |

(52) U.S. Cl.
CPC ............... *H02J 7/0047* (2013.01); *G08B 21/18* (2013.01)

(58) Field of Classification Search
None
See application file for complete search history.

(56) References Cited

U.S. PATENT DOCUMENTS

| 3,879,593 | A |   | 4/1975  | Larson |
| 5,477,129 | A | * | 12/1995 | Myslinski ............. 340/636.1 |
| 5,745,037 | A |   | 4/1998  | Guthrie et al. |
| 6,711,414 | B1 |  | 3/2004  | Lightman et al. |
| 7,088,234 | B2 |  | 8/2006  | Naito et al. |
| 8,541,745 | B2 |  | 9/2013  | Dickinson et al. |
| 8,854,925 | B1 |  | 10/2014 | Lee et al. |
| 8,856,948 | B1 |  | 10/2014 | Robison et al. |
| 2004/0133716 | A1 | * | 7/2004 | Lee ............................ 710/72 |
| 2005/0184870 | A1 |   | 8/2005 | Galperin et al. |
| 2005/0272408 | A1 |   | 12/2005 | Wilkes-Gibbs et al. |
| 2006/0135218 | A1 | * | 6/2006 | Son et al. ............... 455/573 |
| 2007/0087790 | A1 |   | 4/2007 | Worick et al. |

(Continued)

FOREIGN PATENT DOCUMENTS

| EP | 1220459 A1 | 7/2002 |
| EP | 1615187 A1 | 1/2006 |

(Continued)

OTHER PUBLICATIONS

European Search Report from EP application No. 14192629.5, dated Apr. 4, 2015, 8 pgs.

(Continued)

*Primary Examiner* — Julie Lieu
(74) *Attorney, Agent, or Firm* — Shumaker & Sieffert, P.A.

(57) ABSTRACT

A computing device can include one or more processors, and a charging module operable by the one or more processors to determine a charging state of a second computing device, responsive to determining that the charging state of the second computing devices indicates the second computing device is operatively coupled to a power source, output by the first computing device and for display, a notification, and responsive to determining that the charging state of the second computing device indicates the second computing device is disconnected from the power source, send, by the first computing device, to the second computing device, an indication of the notification.

20 Claims, 4 Drawing Sheets

(56) References Cited

U.S. PATENT DOCUMENTS

| | | |
|---|---|---|
| 2008/0268780 A1 | 10/2008 | Werner et al. |
| 2010/0201533 A1* | 8/2010 | Kirby et al. ............... 340/636.1 |
| 2011/0080289 A1 | 4/2011 | Minton |
| 2012/0052922 A1 | 3/2012 | Li |
| 2012/0065909 A1* | 3/2012 | Patino et al. .................... 702/63 |
| 2012/0108215 A1 | 5/2012 | Kameli |
| 2012/0190305 A1* | 7/2012 | Wuidart ...................... 455/41.3 |
| 2012/0194976 A1 | 8/2012 | Golko et al. |
| 2012/0306655 A1* | 12/2012 | Tan et al. .................. 340/636.1 |
| 2013/0002441 A1* | 1/2013 | Khan ......................... 340/636.1 |
| 2013/0076594 A1 | 3/2013 | Sirpal et al. |
| 2013/0127980 A1 | 5/2013 | Haddick et al. |
| 2013/0154358 A1* | 6/2013 | Kai ................................ 307/9.1 |
| 2013/0214931 A1* | 8/2013 | Chia .......................... 340/815.4 |
| 2013/0222236 A1 | 8/2013 | Gardenfors et al. |
| 2013/0225127 A1* | 8/2013 | Cavacuiti et al. ............. 455/411 |
| 2013/0335223 A1* | 12/2013 | Brown et al. .............. 340/568.1 |
| 2013/0346025 A1* | 12/2013 | Schulz ......................... 702/182 |
| 2014/0045463 A1 | 2/2014 | Hsieh et al. |
| 2014/0172973 A1* | 6/2014 | Zadorozny et al. .......... 709/204 |
| 2014/0372097 A1 | 12/2014 | Karvonen et al. |
| 2015/0082406 A1 | 3/2015 | Park et al. |
| 2015/0160622 A1 | 6/2015 | Kim et al. |

FOREIGN PATENT DOCUMENTS

| | | |
|---|---|---|
| KR | 101104354 B1 | 1/2012 |
| KR | 1020130086761 A | 8/2013 |
| WO | 2012172970 A1 | 12/2012 |

OTHER PUBLICATIONS

International Search Report and Written Opinion from International Application No. PCT/US2015/019636, dated Jun. 2, 2015, 12 pp.

Notice of Preliminary Rejection from Korean Application No. 10-2014-0157451, dated Jun. 23, 2015, 7 pp.

Preliminary Rejection and English Translation from counterpart Korean Application No. 10-2014-0157451, dated Jun. 23, 2015, 7 pp.

* cited by examiner

REDIRECTING NOTIFICATIONS TO A WEARABLE COMPUTING DEVICE

This application claims the benefit of U.S. Provisional Patent Application No. 61/903,231, filed on Nov. 12, 2013, the entire content of which is incorporated herein by reference.

BACKGROUND

Mobile computing devices allow a user to perform a variety of functions. For example, mobile computing devices may be capable of accessing the Internet, executing gaming applications, playing media, sending and receiving messages, as well as providing functionality of a traditional cellular telephone. In some examples, a user may wear such mobile computing devices (e.g., by attachment and/or coupling to the user's body and/or clothing). Notifications may be transmitted from a host device to the wearable computing device. However, in some instances, the user may not receive the notifications transmitted to the wearable computing device if the user removes the wearable computing device.

SUMMARY

In one example, the disclosure describes a method that includes determining, by a first computing device, a charging state of a second computing device, responsive to determining that the charging state of the second computing device indicates the second computing device is operatively coupled to a power source, outputting, by the first computing device and for display, a notification, and responsive to determining that the charging state of the second computing device indicates the second computing device is disconnected from the power source, sending, by the first computing device, to the second computing device, an indication of the notification.

In another example, the disclosure describes a first computing device that includes one or more processors and a charging module operable by the one or more processors to determine a charging state of a second computing device, responsive to determining that the charging state of the second computing devices indicates the second computing device is operatively coupled to a power source, output by the first computing device and for display, a notification, and responsive to determining that the charging state of the second computing device indicates the second computing device is disconnected from the power source, send, by the first computing device, to the second computing device, an indication of the notification.

In an additional example, the disclosure describes a computer-readable storage device storing instructions that, when executed, cause at least one processor of a first computing device to determine, by a first computing device, a charging state of a second computing device, responsive to determining that the charging state of the second computing device indicates the second computing device is operatively coupled to a power source, output, by the first computing device and for display, a notification, and responsive to determining that the charging state of the second computing device indicates the second computing device is disconnected from the power source, send, by the first computing device, to the second computing device, an indication of the notification.

The details of one or more examples are set forth in the accompanying drawings and the description below. Other features, objects, and advantages of the disclosure will be apparent from the description and drawings, and from the claims.

DETAILED DESCRIPTION

Techniques according to the disclosure describe a system including a mobile computing device and a wearable computing device in which the mobile device is operable to transmit an indication of a notification based at least in part on a current charging state of the wearable computing device. Examples of the wearable computing device include a smart watch, bracelet, wrist or ankle band, glasses, etc. in some implementations, the wearable computing can include a charging mechanism configured to provide an electric charge to a power source, such as a battery, of the wearable computing device when operatively or physically coupled thereto.

When the wearable computing device is operatively coupled to a power source, a user of the wearable computing device is not likely to be using or wearing the wearable computing device. In some implementations, if the mobile computing device determines that the wearable computing devices is not currently coupled to a power source (e.g., based on a current charging state of the wearable computing device), the mobile computing device may automatically send an indication of a notification (such as a recently-received notification related to one or more services and/or applications) to the wearable computing device. In some implementations, if the mobile computing device determines that the wearable computing device is in fact currently coupled to a power source (e.g., based on the charging state of the wearable computing device), the mobile computing device may proceed to send an indication of the notification to the wearable computing device. Determining whether to send an indication of a notification to the wearable computing device based on the charging state of the wearable computing device may reduce the amount of user interaction required to select whether the wearable computing device should receive notifications from the mobile computing device.

Figure 1:
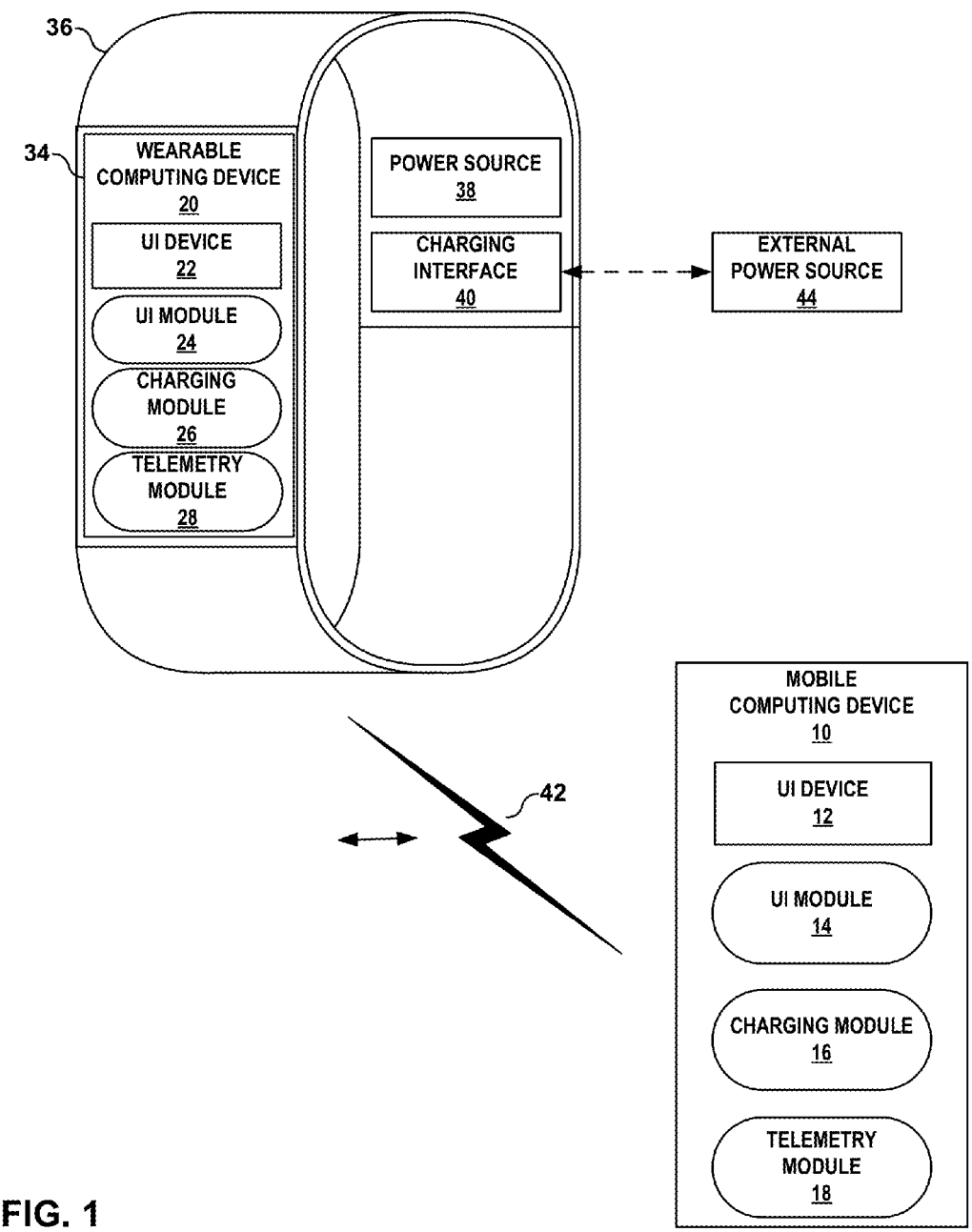
FIG. 1 is a conceptual block diagram illustrating an example system includes a mobile computing device and a wearable computing device in which the devices are operable to transmit an indication of a notifications based at least in part on a charging state of the wearable computing device in accordance with one or more techniques of the present disclosure.

FIG. 1 is a conceptual block diagram illustrating an example system including a mobile computing device 10 and a wearable computing device 20 in which the devices are operable to transmit an indication of a notifications based at least in part on a charging state of the wearable computing device in accordance with one or more techniques of the present disclosure. In the example of FIG. 1, mobile computing device 10 includes at least one user interface (UI) device 12, a UI module 14, a charging module 16, and a telemetry module 18. Other examples of mobile computing device 10 that implement techniques of this disclosure may include additional components not shown in FIG. 1. Examples of mobile computing device 10 may include, but are not limited to, portable devices such as mobile phones (including smart phones), laptop computers, desktop computers, tablet computers, smart television platforms, cameras, personal digital assistants (PDAs), etc.

In some examples, other types of devices may be operable to transmit an indication of a notification to wearable computing device 10. For instance, one or more servers, virtual devices (e.g., virtual machines), or cloud devices may transmit an indication of a notification to wearable computing device 20, either directly, or through mobile computing device 10. In the case that the notifications are sent by another type of device, such as a cloud device comprising one or more networked computing devices, through mobile computing device 10, mobile computing device 10 may receive and relay the notification to wearable computing device 20.

For the purposes of illustration only, wearable computing device 20 may comprise a wristband, armband, ankle band, etc. Wearable computing device 20 may also comprise other types of wearable computing devices other than those illustrated in FIG. 1, including any type of wearable computing device that supports receiving notifications. Accordingly, the illustrations of FIG. 1 should not be considered to limit the configuration of wearable computing device 20.

Wearable computing device 20 includes at least one user interface (UI) device 22, a UI module 24, and a charging module 26. In some examples, UI device 22 and other electronic components of wearable computing device 20 may be at least partially enclosed by a housing 34. Additionally, wearable computing device 20 can include a band 36 or other member, such as a strap or frame, for physically securing wearable computing device 20 when being worn by a user. In the example of FIG. 1, band 36 is mechanically coupled to housing 34. In some examples, instead of band 36 and housing 34 being separate structures mechanically coupled to each other, band 36 and housing 34 may be a single, unitary structure. Other examples of wearable computing device 20 that implement techniques of this disclosure may include additional components not shown in FIG. 1.

Power source 38 provides power to wearable computing device 20. Power source 34 may be mechanically coupled to band 36 and/or housing 34. Charging interface 36 may operatively couple external power source 44, e.g., an AC adapter or DC power source to power source 34. In various examples, charging interface 40 may also comprise a universal serial bus (USB) or other digital interface, such as Thunderbolt, IEEE (Institute of Electrical and Electronics Engineers) 1394, etc. that is capable of transmitting power to power source 38 of wearable computing device 38 over the interface. Charging interface 40 may also receive power from external power source 44 using various wireless charging interfaces, such as inductance-based charging systems. Charging interface 40 may transmit power to power source 38. Charging module 26 may detect that charging power source 38 is charging or operatively coupled to external power source 44 via charging interface 40, e.g. by receiving a message from charging interface 40.

Wearable computing device 20 can include at least one UI device 22. A user associated with wearable computing device 20 may interact with wearable computing device 20 by providing various user inputs into wearable computing device 20, e.g., using at least one UI device 22. In some examples, the at least one UI device 22 is configured to receive tactile, audio, or visual input. In addition to receiving input from a user, UI device 22 can be configured to output content such as a graphical user interface (GUI) for display, e.g., at a display device associated with wearable computing device 20. In some examples, UI device 22 can include a display and/or a presence-sensitive input device. In some examples, the display and the presence-sensitive input device may be integrated into a presence-sensitive display, which displays the GUI and receives input from the user using capacitive, inductive, and/or optical detection at or near the presence sensitive display. In other examples, the display device can be physically separate from a presence-sensitive device associated with wearable computing device 20.

As shown in FIG. 1, wearable computing device 20 also can include UI module 24. UI module 24 can perform one or more functions to receive indication of input, such as user input, and send the indications of the input to other components associated with wearable computing device 20. For example, UI module 24 may receive an indication of a gesture performed by the user at UI device 22. UI module 24 may also receive information from components associated with wearable computing device 20, such as charging module 26. UI module 24 may cause other components associated with wearable computing device 20, such as UI device 22, to provide output based on the information. For instance, UI module 24 may receive information related to the charging state of wearable computing device 20, e.g. whether charging interface 40 is operatively coupled to external power source 44 from charging module 26 and cause UI device 22 to display information related to the charging state of power source 38 at a display device associated with wearable computing device 20 (e.g., which is part of wearable computing device 20 or is operably coupled to wearable computing device 20).

UI module 24 may be implemented in various ways. For example, UI module 24 can be implemented as a downloadable or pre-installed application or "app." In another example, UI module 24 can be implemented as part of a hardware unit of wearable computing device 20. In another example, UI module 24 can be implemented as part of an operating system of wearable computing device 20.

Wearable computing device 20 can also include charging module 26. Charging mode module 26 can be implemented in various ways. For example, charging mode module 26 can be implemented as a downloadable or pre-installed application or "app." In other examples, access mode module 26 can be implemented as part of a hardware unit of wearable computing device 20 or as part of an operating system of wearable computing device 20. Charging module 26 may generate one or messages responsive to determining that power source 38 has been operatively coupled or disconnected from external power source 44. Charging module 26 may receive a notification of the coupling or disconnection from external power source 44 from charging interface 40, in some examples.

Wearable computing device 20 also includes telemetry module 28. In some examples, wearable computing device 20 can be configured to transmit data indicating the charging state of wearable computing device 20 to mobile computing device 10 using telemetry module 28. Wearable computing device 20 may also receive information of a notification from mobile computing device 10 using telemetry module 28. The indication of the notification may comprise an indication of an image, text message, video, e-mail, or any other information related to a notification of mobile computing device 10. UI module 24 may output the indication of a notification for display.

Charging module 26 can receive data from components associated with wearable computing device 20, such as UI module 24, power source 34, and/or charging interface 36. Charging module 26 can be operable to perform a predetermined action in response to receiving the data. For example, charging module 26 may determine. whether power source 38 is operatively coupled or disconnected from external power source 44, based on an indication received from charging interface 40. Responsive to determining whether power source 38 is operatively coupled or disconnected from external power source 44, charging module 26 may transmit a message to mobile computing device 10 indicating the whether wearable computing device 20 is coupled or disconnected from external power source 44.

In accordance with one or more aspects of this disclosure, wearable computing device 20 may be configured to receive an indication of a notification based on the charging state of wearable computing device 20. As examples, wearable computing device 20 may not receive an indication of a notification from telemetry module 28 when wearable computing device 20 is operatively coupled to, e.g. connected to, external power source 44, but may be configured to receive an indication of a notification when wearable computing device 20 is disconnected from external power source 44.

In some examples, mobile computing device 10 may determine that wearable computing device 20 is operatively coupled to external power source 44 by receiving a message from wireless telemetry module 28 of wearable computing device 20. Mobile computing device 10 may receive the message using wireless telemetry module 18. Wireless telemetry module 28 may determine that power source 38 of wearable computing device 20 is operatively coupled to external power source 44 based on an indication from charging interface 40. Mobile computing device 10 may receive the message from telemetry module 28 via a wireless communication link 42. In some examples, wireless communication link 42 may comprise at least one of an IEEE 802.11x (so-called "WiFi"), Bluetooth, 3G or 4G wireless data connection. In some examples, wearable computing device 20 may be operable to receive an indication of a notification based on the charging state of wearable computing device 20 via wireless communication link 42 using telemetry module 28 without being in the immediate physical proximity of another mobile computing device, e.g. mobile computing device 10. For instance, wearable computing device 20 may be configured to receive an indication of a notification using only a wireless data connection, e.g. a cellular data connection without the interaction of wearable computing device 20.

Responsive to receiving the notification that wearable computing device 20 is operatively coupled to external power source 44, UI module 14 may output and for display, e.g. at UI device 12, a notification. The notification may comprise an indication of an e-mail, Multimedia Messaging Service (MMS) message, video, application notification, image, web page, or any other notification capable of being generated by UI module 14.

Wearable computing device 20 may also send a message indicating that wearable computing device is disconnected from external power source 44 to mobile computing device 10. Charging module 26 may determine that wearable computing device 20 is no longer operatively coupled to external power source 44 by receiving a notification from charging interface 40. Responsive to determining that wearable computing device 20 is disconnected from external power source 44, telemetry module 28 may transmit the message indicating that wearable computing device 20 is disconnected from external power source 44 to mobile computing device 10.

Mobile computing device 10 may receive the message using telemetry module 18. Based on the received message, mobile computing device 10 determines that wearable computing device 20 is disconnected from external power source 44.

Responsive to determining that wearable computing device 20 is connected to external power source 44, mobile computing device 10 may transmit an indication of a notification to wearable computing device 10. An indication of the notification may comprise the notification itself, or information related to the notification. In various examples, the indication of the notification may comprise an e-mail, Multimedia Messaging Service (MMS) message, video, application notification, image, web page, or any other data of mobile computing device 10. In some examples, the indication of the notification may also comprise a text-based, and/or graphical indication of a notification, e.g. a notification that the user has a text message or an e-mail, etc.

Wearable computing device 20 may receive the indication of the notification using telemetry module 28. In some examples, wearable computing device 20 may output and for display, the indication of the notification with UI module 24 at UI device 22 or another external display.

Mobile computing device 10 and/or wearable computing device 20 may output, for display, an indication of the charging state of wearable computing device 20. In one example, wearable computing device 20 may output, for display, an indication at UI device 22 indicating whether wearable computing device 20 is operatively coupled to external power source 44. When wearable computing device 20 is operatively coupled to external power source 44, the indication may further indicate that wearable computing device 20 is not configured to receive notifications from mobile computing device 10 because wearable computing device 20 is operatively coupled to external power source 44. When wearable computing device 20 is disconnected from external power source 44, the indication may further indicate that wearable computing device is configured to receive an indication of a notification from mobile computing device 10.

Similarly, responsive to receiving a message related to whether wearable computing device 20 is coupled to or disconnected to external power source 44 of wearable computing device 20, mobile computing device 10 may output and for display at UI device 12, an indication of whether wearable computing device 20 is operatively coupled to, or disconnected from external power source 44. As one example, responsive to receiving a message that wearable computing device 20 is operatively coupled to external power source 44, UI module 14 may output a notification indicating that indicates wearable computing device 20 operatively coupled to external power source 44. The message may further indicate that mobile computing device 10 is not configured to transmit an indication of a notification to wearable computing device 20 while wearable computing device 20 is operatively coupled to external power source 44.

In some other examples, mobile computing device 10 may be communicatively coupled with more than one wearable computing device, e.g. similar to wearable computing device 20. Each wearable computing device may be configured to receive an indication of a notification from mobile computing device 10 via a wireless communication link, such as wireless communication link 42. Each of the wearable computing devices may be configured to send a message indicating whether the wearable computing devices are operatively coupled to an external power source, as described above with respect to wearable computing device 20.

Each message indicating the charging state of the wearable computing devices may include an identifier that identifies each of the wearable computing devices to mobile computing device 10. Based on the identifiers included in the message, mobile computing device 10 may determine which of the wearable computing devices are operatively coupled to an external power source, and should not receive an indication of a notification from mobile computing device 10, and which of the wearable computing devices should receive an indication of a notification from mobile computing device 10.

Figure 2:
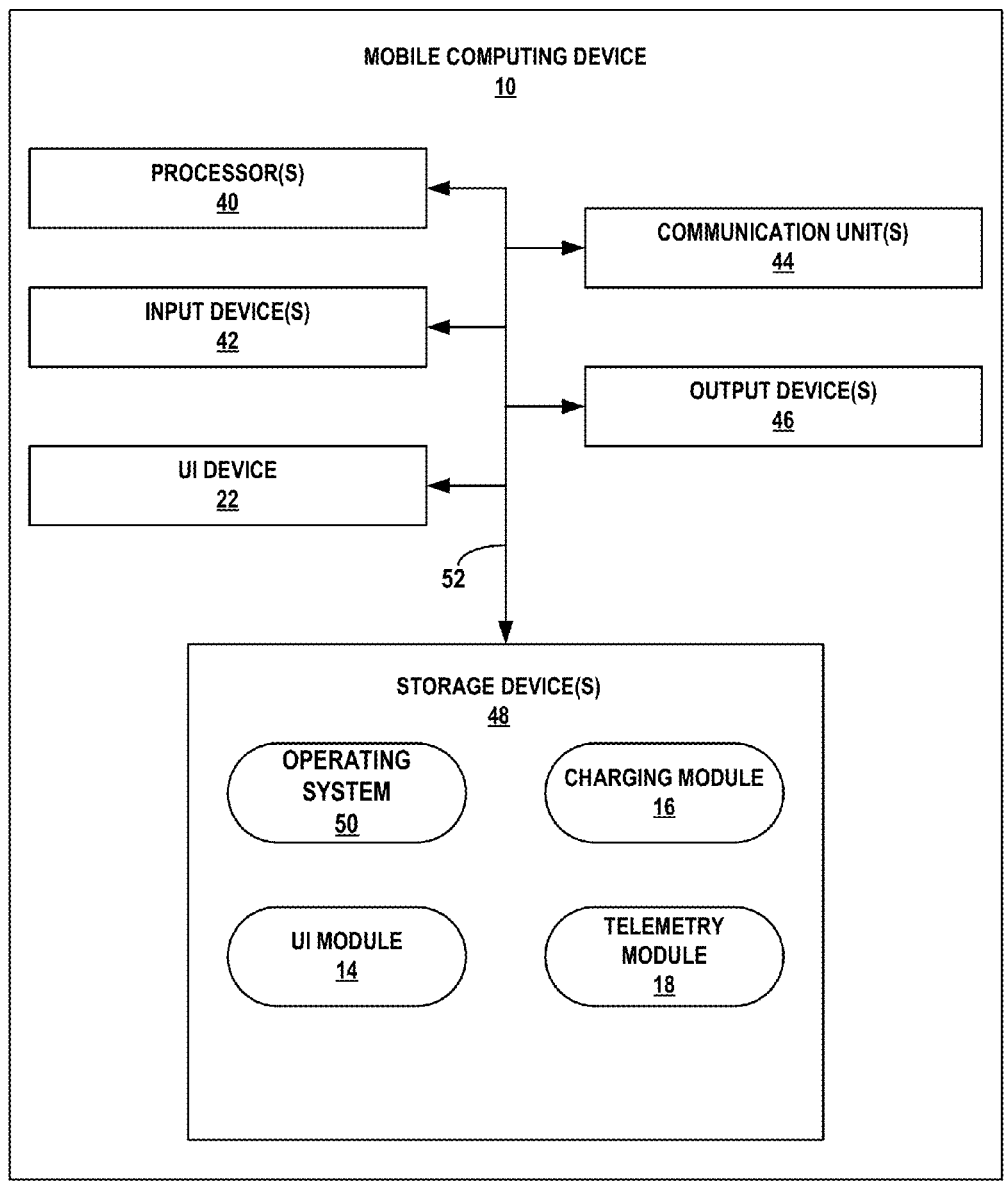
FIG. 2 is a block diagram illustrating further details of one example of a mobile computing device, in accordance with one or more techniques of the present disclosure.

FIG. 2 is a block diagram illustrating further details of one example of a mobile computing device 10 as shown in FIG. 1, in accordance with one or more techniques of the present disclosure. FIG. 2 illustrates only one particular example of mobile computing device 10 as shown in FIG. 1, and many other examples of mobile computing device 10 may be used in other instances.

As shown in the example of FIG. 2, mobile computing device 10 includes one or more processors 40, one or more input devices 42, one or more communication units 44, one or more output devices 46, one or more storage devices 48, and user interface (UI) device 12. In the example of FIG. 2, mobile computing device 10 further includes UI module 14, charging module 16, telemetry module 18, and operating system 50, which are executable by one or more processors 40. Each of components 12, 40, 42, 44, 46, and 48 are coupled (physically, communicatively, and/or operatively) using communication channels 52 for inter-component communications. In some examples, communication channels 52 may include a system bus, a network connection, an inter-process communication data structure, or any other method for communicating data. UI module 14, telemetry module 18, and operating system 50, may also communicate information with one another, as well as with other components in mobile computing device 10.

One or more processors 40, in one example, are configured to implement functionality and/or process instructions for execution within mobile computing device 10. For example, processors 40 may be capable of processing instructions stored by one or more storage devices 48. Examples of one or more processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within mobile computing device 10 during operation. Storage devices 48, in some examples, include a computer-readable storage medium or computer-readable storage device. In some examples, storage devices 48 include a temporary memory, meaning that a primary purpose of storage device 48 is not long-term storage. Storage devices 48, in some examples, include a volatile memory, meaning that storage device 48 does not maintain stored contents when power is not provided to storage device 48. Examples of volatile memories include random access memories (RAM), dynamic random access memories (DRAM), static random access memories (SRAM), and other forms of volatile memories known in the art. In some examples, storage devices 48 are used to store program instructions for execution by processors 40. Storage devices 48, in some examples, are used by software or applications running on mobile computing device 10 (e.g., mobile computing device access mode module 16) to temporarily store information during program execution.

In some examples, storage devices 48 may further include one or more storage device 48 configured for longer-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Mobile computing device 10, in some examples, also includes one or more communication units 44. Mobile computing device 10, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G, 4G, WiGig, and WiFi radios computing devices as well as Universal Serial Bus (USB). In some examples, mobile computing device 10 utilizes communication unit 44 to wirelessly communicate with an external device such as wearable computing device 20. Communication unit 44 may be controlled by telemetry module 18.

Mobile computing device 10, in one example, also includes one or more input devices 42. Input device 42, in some examples, is configured to receive input from a user through tactile, audio, or video sources. Examples of input device 42 include a presence-sensitive device, such as a presence-sensitive display, a mouse, a keyboard, a voice responsive system, video camera, microphone or any other type of device for detecting a command from a user. In some examples, a presence-sensitive display includes a touch-sensitive display.

One or more output devices 46 may also be included in mobile computing device 10. Output device 46, in some examples, is configured to provide output to a user using tactile, audio, or video stimuli. Output device 46, in one example, includes a presence-sensitive display, a sound card, a video graphics adapter card, or any other type of device for converting a signal into an appropriate form understandable to humans or machines. Additional examples of output device 46 include a speaker, a cathode ray tube (CRT) monitor, a liquid crystal display (LCD), organic light emitting diode (OLED), or any other type of device that can generate intelligible output to a user. In some examples, UI device 12 may include functionality of one or more of input devices 42 and/or output devices 46.

Mobile computing device 10 also can include UI device 12. In some examples, UI device 12 is configured to receive tactile, audio, or visual input. In addition to receiving input from a user, UI device 12 can be configured to output content such as a GUI for display at a display device, such as a presence-sensitive display. In some examples, UI device 12 can include a presence-sensitive display that displays a GUI and receives input from a user using capacitive, inductive, and/or optical detection at or near the presence sensitive display. In some examples, UI device 12 is both one of input devices 44 and one of output devices 46.

In some examples, UI device 12 of mobile computing device 10 may include functionality of input devices 42 and/or output devices 46. In some examples, a presence-sensitive device may detect an object at and/or near the presence-sensitive device. As one example range, a presence-sensitive device may detect an object, such as a finger or stylus, which is within two inches or less of the presence-sensitive device. The presence-sensitive device may determine a location (e.g., an (x,y) coordinate) of the presence-sensitive device at which the object was detected. In another example range, a presence-sensitive device may detect an object six inches or less from the presence-sensitive device. Other example ranges are also possible. The presence-sensitive device may determine the location of the device selected by the object using capacitive, inductive, and/or optical recognition techniques. In some examples, the presence-sensitive device provides output to a user using tactile, audio, or video stimuli as described with respect to output device 46.

Mobile computing device 10 may include operating system 50. Operating system 50, in some examples, controls the operation of components of mobile computing device 10. For example, operating system 50, in one example, facilitates the communication of UI module 14 and mobile computing device access mode module 16 with processors 40, communication units 44, storage devices 48, input devices 42, and output devices 46. UI module 14, telemetry module, and charging module 16 can each include program instructions and/or data that are executable by mobile computing device 10 (e.g., by one or more processors 40). As one example, UI module 14 can include instructions that cause mobile computing device 10 to perform one or more of the operations and actions described in the present disclosure.

In some examples, charging module 16 can be operable to transmit messages with a mobile computing device, e.g., via a direct communication protocol between mobile computing device 10 and wearable computing device 20, such as a Bluetooth, 3G, 4G, or WiFi wireless network connection. For example, when mobile computing device 10 is able to establish a direct wireless communication connection with wearable computing device 20.

Mobile computing device 10 may also include charging module 16. Charging module 16 may be configured to determine a charging state of wearable computing device 20. Based on the charging state that charging module 16 determines, mobile computing device 10 may determine whether wearable computing device 20 is operatively coupled to a power source, such as external power source 34. Based on the charging state of wearable computing device 20, which is indicated in the preceding pseudocode, and which mobile computing device 10 may receive an indication of in a message, mobile computing device 10 may determine whether wearable computing device 10 is operatively coupled to, or disconnected from, external power source 44. As an example, mobile computing device 10 may determine that wearable computing device 20 is operatively coupled to external power source 44 if the status variable described in the code above is either "BATTERY_STATUS_CHARGING" or "BATTERY_STATUS_FULL," which is equivalent to the Boolean value, "isCharging."

In another example, wearable computing device 20 may be configured to transmit changes in the charging state of wearable computing device 20, e.g. to charging module 16. Using the preceding filter, an application, or module may transmit a message to charging module 16 indicating a change in the charging state of wearable computing device 20, i.e. that wearable computing device has become coupled to, or has become disconnected from external power source 44.

Based on the whether charging module 16 determines wearable computing device is or is not coupled to an external power source, telemetry module 18 may send an indication of a notification to a wearable computing device, e.g. wearable computing device 20. If charging module 16 determines that wearable computing device 20 is operatively coupled to external power source 44, UI module 14 may output and for display, e.g. at one of output devices 46, a notification. If charging module 16 determines that wearable computing device is not charging, telemetry module 28 may send an indication of the notification to a wearable computing device, e.g. wearable computing device 20.

In various examples, a user of wearable computing device 20 may want to have mobile computing device 10 redirect notifications from to wearable computing device 20 even though wearable computing device 20 is operatively coupled to external power source 44. As one example, mobile computing device 10 may receive an indication, such as an a user input from one of input devices 42, indicating that wearable computing device 20 should receive notifications from mobile computing device 10 even if wearable computing device 20 is operatively coupled to a power source, such as external power source 44.

As an example, a user may connect wearable computing device 20 to portable battery pack that allows the user to continue wearing wearable computing device 20 while charging. As another example, the user may be closer to the wearable computing device 20 than to the mobile computing device 20, and may prefer to continue receive notifications at wearable computing device 20. Responsive to receiving the indication that wearable computing device 20 should receive notifications when operatively coupled to external power source 44, telemetry module 18 may transmit an indication of the notification to wearable computing device 20 when wearable computing device 20 is operatively coupled to external power source 44.

As another example, a user or application may wish to have mobile computing device 10 redirect certain types of notifications to wearable computing device 20 when wearable computing device 20 is operatively coupled to a power source based on a type associated with each notification. Example notifications may include emergency notifications, such as emergency weather notifications, alarm notifications, etc. Mobile computing device 10 may receive an indication of the type of notification, e.g. from an application, from a user input received using input devices 42, and/or from a message received from wearable computing device 20. Based on whether a notification has the associated type, mobile computing device 10 may output and for display, the notification, or may transmit an indication of the notification to wearable computing device 20 using telemetry module 18.

A user or application may also prefer to have mobile computing device 10 redirect notifications to wearable computing device 20 when wearable computing device 20 is operatively coupled to external power source 44 based on the time of day. For example, a user may indicate that alarms or messages should or should not be redirected to wearable computing device 20 during a certain time of day, because the user does not wish to be disturbed. Mobile computing device 10 may determine the time of day. Based on the determined time of day, mobile computing device 10 may output and for display, the notification, and/or may send an indication of the notification to the second computing device.

Mobile computing device 10 can include additional components that, for clarity, are not shown in FIG. 2. Similarly, the components of mobile computing device 10 shown in FIG. 2 may not be necessary in every example of mobile computing device 10.

Figure 3:
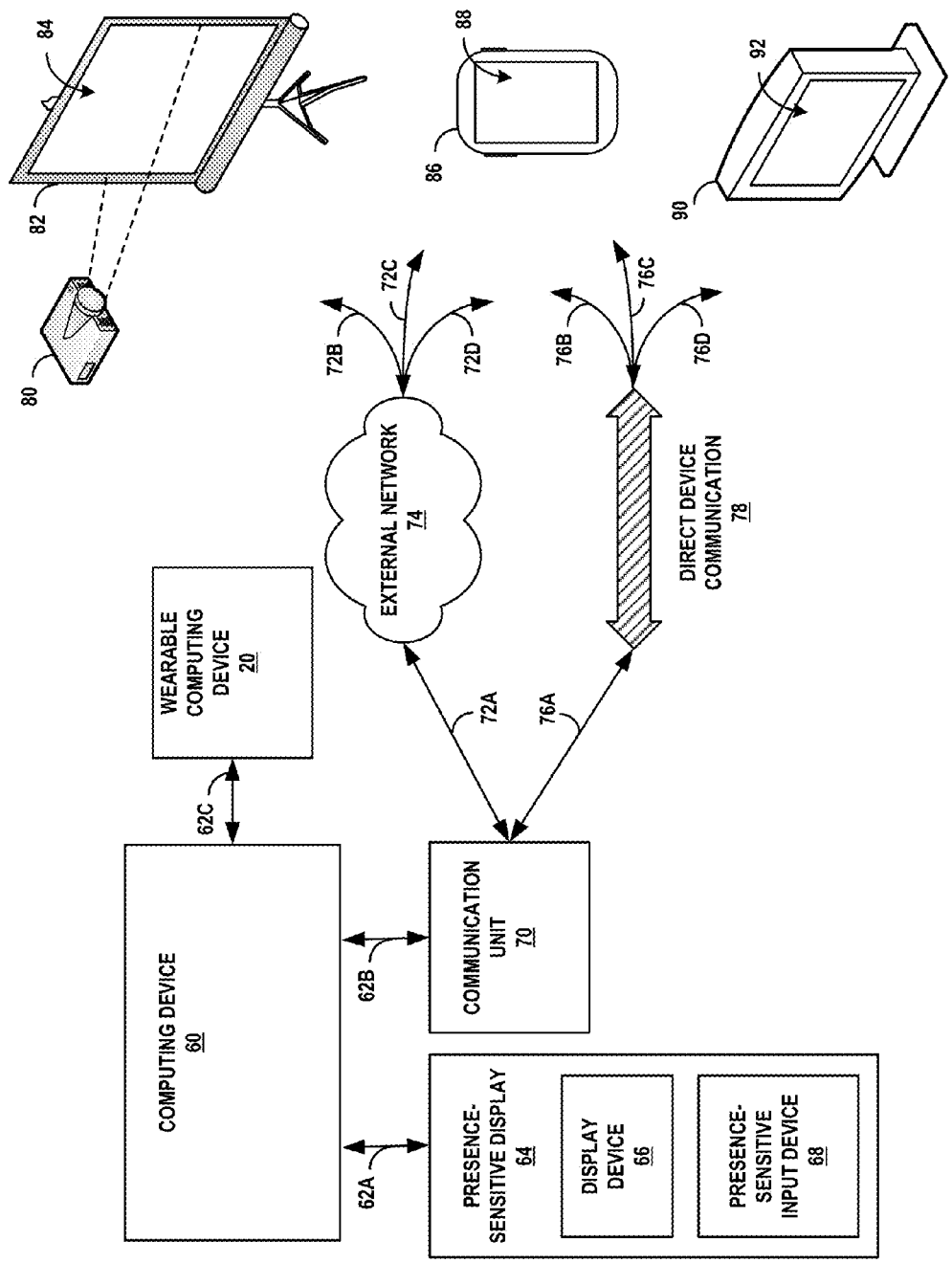
FIG. 3 is a conceptual block diagram illustrating an example mobile computing device that outputs graphical content for display at a remote device and can output an indication of a notification based on the charging state of a wearable computing device, in accordance with one or more techniques of the present disclosure.

FIG. 3 is a conceptual block diagram illustrating an example mobile computing device that outputs graphical content for display at a remote device and can output an indication of a notification based on the charging state of a wearable computing device, in accordance with one or more techniques of the present disclosure. Graphical content, generally, may include any visual information that may be output for display, such as text, images, a group of moving images, etc. The example shown in FIG. 3 includes a computing device 60, presence-sensitive display 64, communication unit 70, projector 80, projector screen 82, mobile device 86, and visual display device 90. Although shown for purposes of example in FIGS. 1 and 2 as a mobile computing device 10, a computing device such as computing device 60 may, generally, be any component or system that includes a processor or other suitable computing environment for executing software instructions and, for example, need not include a presence-sensitive display.

As shown in the example of FIG. 3, computing device 60 may be a processor that includes functionality as described with respect to processors 40 in FIG. 2. In such examples, computing device 60 may be operatively coupled to presence-sensitive display 64 by a communication channel 62A, which may be a system bus or other suitable connection. Computing device 60 may also be operatively coupled to communication unit 70, further described below, by a communication channel 62B, which may also be a system bus or other suitable connection. Although shown separately as an example in FIG. 4, computing device 60 may be operatively coupled to presence-sensitive display 64 and communication unit 70 by any number of one or more communication channels.

In other examples, such as illustrated previously by mobile computing device 10 in FIGS. 1 and 2, a computing device may refer to a portable or mobile device such as mobile phones (including smart phones), laptop computers, wearable computing devices such as smart watches or smart glasses, etc. In some examples, a computing device may be a desktop computer, tablet computer, smart television platform, camera, personal digital assistant (PDA), server, mainframe, etc.

Presence-sensitive display 64 may include display device 66 and presence-sensitive input device 68. Display device 66 may, for example, receive data from computing device 60 and display the graphical content. In some examples, presence-sensitive input device 68 may determine one or more user inputs (e.g., continuous gestures, multi-touch gestures, single-touch gestures, etc.) at presence-sensitive display 64 using capacitive, inductive, and/or optical recognition techniques and send indications of such user input to computing device 60 using communication channel 62A. In some examples, presence-sensitive input device 68 may be physically positioned on top of display device 66 such that, when a user positions an input unit over a graphical element displayed by display device 66, the location at which presence-sensitive input device 68 corresponds to the location of display device 66 at which the graphical element is displayed. In other examples, presence-sensitive input device 68 may be positioned physically apart from display device 66, and locations of presence-sensitive input device 68 may correspond to locations of display device 66, such that input can be made at presence-sensitive input device 68 for interacting with graphical elements displayed at corresponding locations of display device 66.

As shown in FIG. 3, computing device 60 may also include and/or be operatively coupled with communication unit 70. Communication unit 70 may include functionality of communication unit 44 as described in FIG. 2. Examples of communication unit 70 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 60 may also include and/or be operatively coupled with one or more other devices, e.g., input devices, output devices, memory, storage devices, etc. that are not shown in FIG. 3 for purposes of brevity and illustration.

FIG. 3 also illustrates a projector 80 and projector screen 82. Other examples of projection devices may include electronic whiteboards, holographic display devices, and any other suitable devices for displaying graphical content. Projector 80 and projector screen 82 may include one or more communication units that enable the respective devices to communicate with computing device 60. In some examples, the one or more communication units may enable communication between projector 80 and projector screen 82. Projector 80 may receive data from computing device 60 that includes graphical content. Projector 80, in response to receiving the data, may project the graphical content onto projector screen 82. In some examples, projector 80 may determine one or more user inputs (e.g., continuous gestures, multi-touch gestures, single-touch gestures, etc.) at projector screen using optical recognition or other suitable techniques and send indications of such user input using one or more communication units to computing device 60. In such examples, projector screen 82 may be unnecessary, and projector 80 may project graphical content on any suitable medium and detect one or more user inputs using optical recognition or other such suitable techniques.

Projector screen 82, in some examples, may include a presence-sensitive display 84. Presence-sensitive display 84 may include a subset of functionality or all of the functionality of UI device 22 as described in this disclosure. In some examples, presence-sensitive display 84 may include additional functionality. Projector screen 82 (e.g., an electronic whiteboard), may receive data from computing device 60 and display the graphical content. In some examples, presence-sensitive display 84 may determine one or more user inputs (e.g., continuous gestures, multi-touch gestures, single-touch gestures, etc.) at projector screen 82 using capacitive, inductive, and/or optical recognition techniques and send indications of such user input using one or more communication units to computing device 60.

FIG. 3 also illustrates mobile device 86 and visual display device 90. Mobile device 86 and visual display device 90 may each include computing and connectivity capabilities. Examples of mobile device 86 may include e-reader devices, convertible notebook devices, hybrid slate devices, etc. Examples of visual display device 90 may include other semi-stationary devices such as televisions, computer monitors, etc. As shown in FIG. 3, mobile device 86 may include a presence-sensitive display 88. Visual display device 90 may include a presence-sensitive display 92. Presence-sensitive display 92, for example, may receive data from computing device 60 and display the graphical content. In some examples, presence-sensitive display 92 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 60.

As described above, in some examples, computing device 60 may output graphical content for display at presence-sensitive display 64, which is coupled to computing device 60 by a system bus or other suitable communication channel. Computing device 60 may also output graphical content for display at one or more remote devices, such as projector 80, projector screen 82, mobile device 86, and visual display device 90. For instance, computing device 60 may execute one or more instructions to generate and/or modify graphical content in accordance with techniques of the present disclosure. Computing device 60 may output the data that includes the graphical content to a communication unit of computing device 60, such as communication unit 70. Communication unit 70 may send the data to one or more of the remote devices, such as projector 80, projector screen 82, mobile device 86, and/or visual display device 90. In this way, computing device 60 may output the graphical content for display at one or more of the remote devices. In some examples, one or more of the remote devices may output the graphical content at a display device, such as a presence-sensitive display, that is included in and/or operatively coupled to the respective remote device.

In some examples, computing device 60 may not output graphical content at presence-sensitive display 64 that is operatively coupled to computing device 60. In other examples, computing device 60 may output graphical content for display at both a presence-sensitive display 64 that is coupled to computing device 60 by communication channel 62A, and at a display of one or more the remote devices. In such examples, the graphical content may be displayed substantially contemporaneously at each respective device. For instance, some delay may be introduced by the communication latency to send the data that includes the graphical content to the remote device. In some examples, graphical content generated by computing device 60 and output for display at presence-sensitive display 64 may be different than graphical content display output for display at one or more remote devices.

Computing device 60 may send and receive data using any suitable communication techniques. For example, computing device 60 may be operatively coupled to external network 74 using network link 72A. Each of the remote devices illustrated in FIG. 3 may be operatively coupled to network external network 74 by one of respective network links 72B, 72C, and 72D. External network 74 may include network hubs, network switches, network routers, etc., that are operatively inter-coupled thereby providing for the exchange of information between computing device 60 and the remote devices illustrated in FIG. 4. In some examples, network links 72A-72D may be Ethernet, ATM or other network connections. Such connections may be wireless and/or wired connections.

In some examples, computing device 60 may be operatively coupled to one or more of the remote devices included in FIG. 3 using direct device communication 78. Direct device communication 78 may include communications through which computing device 60 sends and receives data directly with a remote device, using wired or wireless communication. That is, in some examples of direct device communication 78, data sent by computing device 60 may not be forwarded by one or more additional devices before being received at the remote device, and vice-versa. Examples of direct device communication 78 may include Bluetooth, Near-Field Communication, Universal Serial Bus, infrared, etc. One or more of the remote devices illustrated in FIG. 3 may be operatively coupled with computing device 60 by communication links 76A-76D. In some examples, communication links 76A-76D may be connections using Bluetooth, Near-Field Communication, Universal Serial Bus, infrared, etc. Such connections may be wireless and/or wired connections.

In accordance with one or more aspects of the disclosure, computing device 60 can be configured to determine a charging state of a second computing device, such wearable computing device 20, via communication channel 62C. Responsive to determining that the charging state of wearable computing device 20 indicates wearable computing device 20 is operatively coupled to a power source, computing device 60 may output and for display, e.g. one or more of presence-sensitive display 64, projector 80, mobile device 86, and remote display 90, a notification using communication unit 70. Responsive to determining that the charging state of the second computing device indicates the second computing device is disconnected from the power source, mobile computing device 10 may send to wearable computing device 20, an indication of the notification using communication unit 70.

Responsive to receiving the indication of the user input, computing device 60 can initiate the task. Additionally, computing device 60 can cause at least one haptic device of haptic device(s) 30 to determine whether a second computing device, e.g. wearable computing device 20 is charging. Responsive to determining that wearable computing device 20 is charging, mobile computing device 10 can output for display, e.g. at one or more of presence sensitive display 64, 84, 88, and 92, a notification. Responsive to determining that the wearable computing device 20 is not charging, mobile computing device 10 can send to wearable computing device 20, an indication of the notification.

Figure 4:
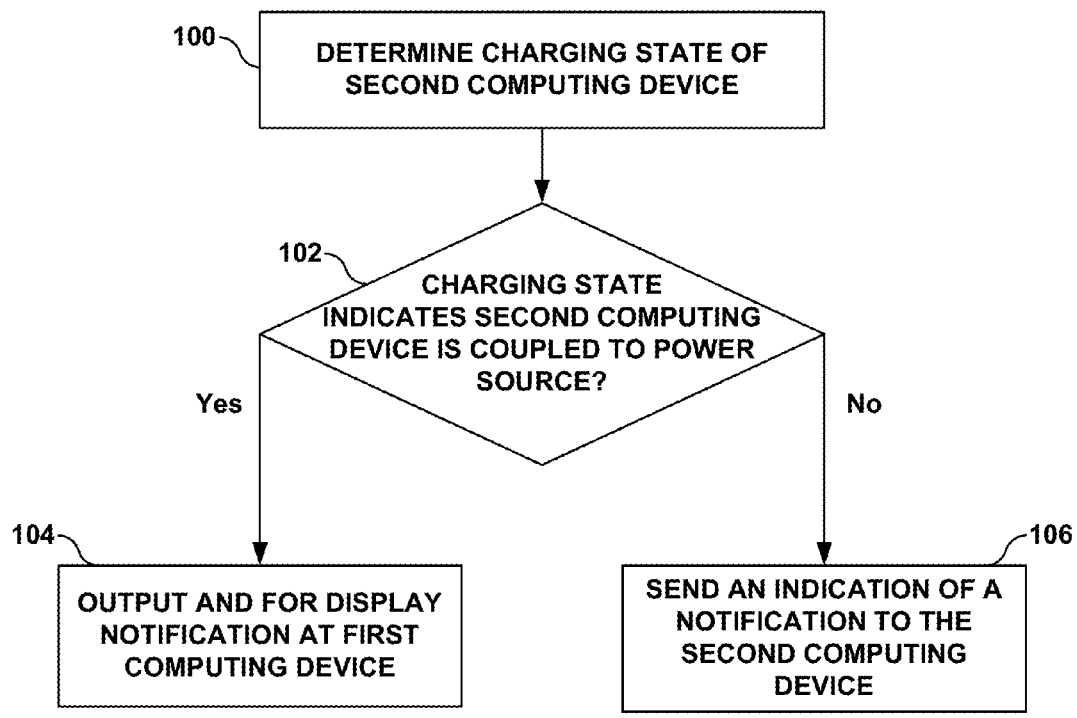
FIG. 4 is a flow diagram illustrating example techniques for outputting notifications at a wearable computing device based at least in part on a charging state of the wearable computing device, in accordance with one or more techniques of the present disclosure.

FIG. 4 is a flow diagram illustrating an example technique for outputting an indication of a notification based at least in part on the charging state of a wearable computing device, in accordance with one or more techniques of the present disclosure. The technique of FIG. 4 may be performed by one or more processors of a computing device, such as wearable computing device 20 illustrated in FIG. 1 and FIG. 2. For purposes of illustration, the technique of FIG. 4 is described below within the context of wearable computing device 20 of FIG. 1 and FIG. 2, although the technique of FIG. 4 may be performed by computing devices having configurations different than that of wearable computing device 20.

The techniques of FIG. 4 include determining, by mobile computing device 10, a charging state of a second computing device, e.g. wearable computing device 20 (100). More particularly, charging module 16 may receive an indication of the charging status of wearable computing device 20 via communication link 42. Charging module 16 of mobile computing device may interpret the charging status received from charging module 16.

Charging module 16 may further determine whether the charging state indicates that wearable computing device 20 is operatively coupled to a power source, such as external power source 44 (102). Responsive to charging module 16 determining that the charging state of wearable computing device 20 indicates that wearable computing device 20 is disconnected from external power source 44 ("Yes" branch of decision block 102), UI device 22 may output a notification (104). Responsive to charging module 16 determining that the charging state of wearable computing device 20 indicates that wearable computing device 20 is disconnected from external power source 44 ("No" branch of decision block 102), telemetry module 18 of mobile computing device 10 may send to telemetry module 28, an indication of the notification via communication link 42 (106).

In some examples, to determine that wearable computing device is charging, telemetry module mobile computing device 10 may further receive from wearable computing device 20, a message indicating the state of wearable computing device 20, e.g. whether warble computing device 20 is operatively coupled with, or disconnected from, external power source 44. Mobile computing device 10 may received the message using telemetry module 18 via communication link 42. Charging module 16 may further determine whether wearable computing device 20 is operatively coupled to external power source 44 based on the message indicating the charging state of wearable computing device 20. In some examples, the message may include an identifier that identifies wearable computing device 20, e.g. among multiple wearable computing devices coupled to mobile computing device 10.

In some examples, mobile computing device 10 may output and for display, e.g. using UI module 14 and UI device 12, a notification. The notification may indicate the charging state of wearable computing device 20, which charging module 16 may have previously determined.

In various examples, mobile computing device 10 may transmit an indication of a notification to wearable computing device 20 via communication link 42 even if the charging state indicates wearable computing device 20 is operatively coupled to external power source 44. In one example, mobile computing device 10 may receive an indication that wearable computing device 20 should receive notifications from wearable computing device 20 if the second computing is operatively coupled to a power source. Mobile computing device 10 may receive the indication from an application, a user input, such as one received using UI device 12, or input devices 42, and/or from wearable computing device 20, e.g. via a message sent via communication link 42. Responsive to receiving the indication, mobile computing device 10 may send to wearable computing device 20, an indication of the notification, e.g. using telemetry module 18, when wearable computing device 20 is operatively coupled to external power source 44, as determined by charging module 16.

In another example, the method of FIG. 4 may further comprise receiving, by mobile computing device 10, an indication of a notification type. The notification type may be associated with, e.g. an alarm notification, emergency notification, text message, or other notification type. In some examples, telemetry module 18 may receive the notification, e.g. using communication link 42. In other examples, a user may provide the indication using UI device 12 and/or input devices 42. Responsive to determining that a type of the notification has a same type of the notification type, mobile computing device 10 may output, and for display, the notification, e.g. using UI device 14 of UI device 12, and telemetry module 18 of mobile computing device 10 may send an indication of the notification using communication link 42 to wearable computing device 20.

In yet another example, mobile computing device 10 may determine a time of day. To output the notification and for display using UI device 12, mobile computing device 10 may output the notification based on the determined time of day. Similarly, to send the indication of the notification to wearable computing device 20, telemetry module 18 may send the indication to wearable computing device 20 based on the determined time of day. In some examples, operating system may determine the time of day, and in some examples, charging module 16 may be configured to determine whether mobile computing device 10 should output the notification for display and/or send the notification to wearable computing device 20.

In one or more examples, the functions described herein may be implemented in hardware, software, firmware, or any combination thereof. If implemented in software, the functions may be stored on or transmitted over, as one or more instructions or code, a computer-readable medium or computer-readable storage device and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media or computer-readable storage device, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, include compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
responsive to determining, by a first computing device, that a second computing device is operatively coupled to a power source, outputting, by the first computing device and for display, a notification; and
responsive to determining, by the first computing device, that the second computing device is disconnected from the power source, sending, by the first computing device, to the second computing device, an indication of the notification.

2. The method of claim 1, further comprising:
receiving, by the first computing device, from the second computing device, a message indicating a charging state of the second computing device; and
determining, by the first computing device, based on the message, whether the second computing device is operatively coupled to the power source.

3. The method of claim 2, wherein the message includes an identifier that identifies the second computing device.

4. The method of claim 1, further comprising:
outputting, by the first computing device and for display, a notification indicating whether the second computing device is operatively coupled to the power source.

5. The method of claim 1, further comprising:
receiving, by the first computing device, an indication that the second computing device should receive notifications from the first computing device if the second computing is operatively coupled to the power source; and
responsive to receiving the indication, sending, by the first computing device, to the second computing device, an indication of the notification when the second computing device is operatively coupled to the power source.

6. The method of claim 1, further comprising:
receiving, by the first computing device, an indication of a notification type; and
responsive to determining that the notification is of the notification type:
outputting, by the first computing device and for display, the notification; and
sending, by the first computing device, to the second computing device, the indication of the notification.

7. The method of claim 1, further comprising:
determining, by the first computing device, a time of day;
wherein outputting the notification and for display comprises outputting, by the first computing device, for display, and based on the determined time of day, the notification,
wherein sending the indication of the notification to the second computing device comprises sending, by the first computing device, to the second computing device, and based on the determined time of day, the indication of the notification.

8. A first computing device comprising:
one or more processors; and
a charging module operable by the one or more processors to:
responsive to determining that a second computing device is operatively coupled to a power source, output by the first computing device and for display, a notification; and
responsive to determining that the second computing device is disconnected from the power source, send, by the first computing device, to the second computing device, an indication of the notification.

9. The first computing device of claim 8, wherein the charging module is further operable to:
receive, by the first computing device, from the second computing device, a message indicating a charging state of the second computing; and
determine, by the first computing device, based on the message, whether the second computing device is operatively coupled to the power source.

10. The first computing device of claim 9, wherein the message includes an identifier that identifies the second computing device.

11. The first computing device of claim 8, wherein the charging module is further operable to:
output, by the first computing device and for display, a notification indicating a charging state of the second computing device.

12. The first computing device of claim 8, wherein the charging module is further operable to:
receive, by the first computing device, an indication that the second computing device should receive notifications from the first computing device if the second computing is operatively coupled to the power source; and
responsive to receiving the indication, send, by the first computing device, to the second computing device, an indication of the notification when the second computing device is operatively coupled to the power source.

13. The first computing device of claim 8, wherein the charging module is further operable to:
receive, by the first computing device, an indication of a notification type; and
responsive to determining that the notification is of the notification type:
output, by the first computing device and for display, the notification; and
sending, by the first computing device, to the second computing device, the indication of the notification.

14. The first computing device of claim 8, wherein the charging module is further operable to:
determine a time of day,
wherein to output the notification and for display, the charging module is further operable to output, by the first computing device and for display, the notification based on the determined time of day,
wherein to send the indication of the notification to the second computing device, the charging module is further operable to send, by the first computing device, to the second computing device, the indication of the notification based on the determined time of day.

15. A non-transitory computer-readable storage device storing instructions that, when executed, cause at least one processor of a first computing device to:
responsive to determining, by a first computing device, a second computing device is operatively coupled to a power source, output, by the first computing device and for display, a notification; and
responsive to determining that the second computing device is disconnected from the power source, send, by the first computing device, to the second computing device, an indication of the notification.

16. The non-transitory computer-readable storage medium of claim 15, further comprising instructions that, when executed, cause the at least one processor of the first computing device to:
receive, by the first computing device, from the second computing device, a message indicating a charging state of the second computing; and
determine, by the first computing device, based on the message, whether the second computing device is operatively coupled to any power source.

17. The non-transitory computer-readable storage medium of claim 16 wherein the message includes an identifier that identifies the second computing device.

18. The non-transitory computer-readable storage medium of claim 16, further comprising instructions that, when executed, cause the at least one processor of the first computing device to:
output, by the second computing device and for display, the indication of the notification.

19. The non-transitory computer-readable storage medium of claim 15, further comprising instructions that, when executed, cause the at least one processor of the first computing device to:
- receive, by the first computing device, an indication that the second computing device should receive notifications from the first computing device if the second computing is operatively coupled to the power source; and
- responsive to receiving the indication, send, by the first computing device, to the second computing device, an indication of the notification when the second computing device is operatively coupled to the power source.

20. The non-transitory computer-readable storage medium of claim 15, further comprising instructions that, when executed, cause the at least one processor of the first computing device to:
- receive, by the first computing device, an indication of a notification type; and
- responsive to determining that a type of the notification has a same type as the notification type:
- output, by the first computing device and for display, the notification; and
- sending, by the first computing device, to the second computing device, the indication of the notification.

* * * * *